(12) United States Patent
Sugawara

(10) Patent No.: US 11,269,218 B2
(45) Date of Patent: Mar. 8, 2022

(54) PHASE DIFFERENCE COMPENSATION ELEMENT, LIQUID CRYSTAL DISPLAY DEVICE AND PROJECTION TYPE IMAGE DISPLAY DEVICE

(71) Applicant: Dexerials Corporation, Tokyo (JP)

(72) Inventor: Junichi Sugawara, Tokyo (JP)

(73) Assignee: Dexerials Corporation, Tokyo (JP)

( * ) Notice: Subject to any disclaimer, the term of this patent is extended or adjusted under 35 U.S.C. 154(b) by 381 days.

(21) Appl. No.: 16/260,750

(22) Filed: Jan. 29, 2019

(65) Prior Publication Data

US 2019/0235295 A1 Aug. 1, 2019

(30) Foreign Application Priority Data

Jan. 31, 2018 (JP) .............................. JP2018-015822

(51) Int. Cl.
*G02F 1/13363* (2006.01)
*G02B 5/30* (2006.01)
*G03B 21/00* (2006.01)
*G02B 1/14* (2015.01)
*G02B 1/115* (2015.01)

(52) U.S. Cl.
CPC ....... *G02F 1/13363* (2013.01); *G02B 5/3083* (2013.01); *G02F 1/133638* (2021.01); *G02B 1/115* (2013.01); *G02B 1/14* (2015.01); *G02F 2413/10* (2013.01); *G03B 21/006* (2013.01)

(58) Field of Classification Search
CPC ........... G02F 1/13363; G02F 1/133638; G02B 5/3083
See application file for complete search history.

(56) References Cited

U.S. PATENT DOCUMENTS

| | | | |
|---|---|---|---|
| 8,842,365 | B2 | 9/2014 | Koike et al. |
| 9,279,928 | B2 | 3/2016 | Koike |
| 9,594,275 | B2 | 3/2017 | Koike et al. |
| 9,784,898 | B2 | 10/2017 | Koike |
| 2007/0258029 | A1 | 11/2007 | Nakagawa et al. |
| 2009/0128719 | A1 | 5/2009 | Tateno |

(Continued)

FOREIGN PATENT DOCUMENTS

| | | |
|---|---|---|
| JP | 2006171327 A | 6/2006 |
| JP | 2007017890 A | 1/2007 |

(Continued)

*Primary Examiner* — Dung T Nguyen
(74) *Attorney, Agent, or Firm* — Osha Bergman Watanabe & Burton LLP

(57) ABSTRACT

Provided is a phase difference compensation element that can improve a contrast of a liquid crystal display device and has durability while suppressing an increase in cost and prolongation of lead time. The phase difference compensation element is formed so that, when an optical anisotropic layer is formed on a substrate, the optical anisotropic layer includes a plurality of birefringent films, and a direction of a combined vector obtained by combining respective vectors of the birefringent films when determining a vector with a direction of a line segment obtained by projecting a film formation direction of each birefringent film on a surface of a transparent substrate and a thickness, is substantially the same as a direction of a line segment obtained by projecting a liquid crystal molecule constituting a liquid crystal cell on the surface of the transparent substrate.

20 Claims, 12 Drawing Sheets

(56) References Cited

U.S. PATENT DOCUMENTS

| | | | |
|---|---|---|---|
| 2009/0225241 A1 | 9/2009 | Fujii | |
| 2009/0244412 A1 | 10/2009 | Tsukagoshi | |
| 2012/0293732 A1* | 11/2012 | Koike | G02B 1/115 349/5 |
| 2016/0054500 A1* | 2/2016 | Koike | G02B 5/3083 353/20 |
| 2018/0120649 A1* | 5/2018 | Yanai | G02F 1/1337 |

FOREIGN PATENT DOCUMENTS

| | | |
|---|---|---|
| JP | 2009145863 A | 7/2009 |
| JP | 2012242449 A | 12/2012 |
| JP | 2015068935 A | 4/2015 |
| JP | 2015082035 A | 4/2015 |
| WO | 2008081919 A1 | 7/2008 |
| WO | 2014168185 A1 | 10/2014 |

\* cited by examiner

Liquid Crystal Display Device 1210

| Liquid Crystal Cell 1220 | Phase Difference Compensation Element 1230 |

FIG. 12

Projection Type Image Display Device 1310

| Light Source 1320 | Liquid Crystal Display Device 1340 | Projection Optical System 1330 |

FIG. 13

PHASE DIFFERENCE COMPENSATION ELEMENT, LIQUID CRYSTAL DISPLAY DEVICE AND PROJECTION TYPE IMAGE DISPLAY DEVICE

This application is based on and claims the benefit of priority from Japanese Patent Application No. 2018-15822, filed on 31 Jan. 2018, the content of which is incorporated herein by reference.

BACKGROUND OF THE INVENTION

Field of the Invention

The present invention relates to a phase difference compensation element, a liquid crystal display device and a projection type image display device.

Related Art

In recent years, in liquid crystal display devices, an optical compensation technique using a phase difference compensation element is used to improve contrast characteristics and viewing angle characteristics. As such a phase difference compensation element, for example, a phase difference compensation element has been proposed in which a negative C-plate formed by laminating high-refractive-index thin films and low-refractive-index thin films alternately by vapor deposition of dielectric material and an O-plate formed of an obliquely vapor-deposited film configured by at least two layers are laminated (see Patent Document 1).

In the phase difference compensation element described in Patent Document 1, disturbance of a polarization of an obliquely incident light to a light modulation element is corrected by a negative C-plate having a structural birefringence by laminating high-refractive-index layers and low-refractive-index layers alternately. Further, disturbance of a polarization caused by a pretilt angle of liquid crystal is corrected by the O-plate formed of the obliquely vapor-deposited film configured by at least two layers.

However, in the negative C-plate described in Patent Document 1, a ratio of optical film thicknesses of two kinds of vapor-deposited films having different refractive indices is determined, and high-refractive-index layers having the same film thickness and low-refractive-index layers having the same film thickness determined based on the ratio are laminated alternately, resulting in a structural birefringence, which causes a phase difference. For this reason, a total number of 80 or more layers are required to be laminated, and an antireflection film is required separately, so that there is concern about high cost and prolonged lead time.

As another phase difference compensation technique, a method of performing an optical compensation by using two phase difference plates formed of an obliquely vapor-deposited film has been proposed (see Patent Document 2). In the optical compensation method described in Patent Document 2, contrast is improved by rotating the two phase difference plates in an in-plane direction and adjusting a relative angle to an optimum position.

However, in the optical compensation method described in Patent Document 2, since two phase difference plates and a rotation mechanism for rotating the two phase difference plates are required, there is concern about a high cost and an increase in mounting space.

Further, there has been proposed a liquid crystal display device using a phase difference compensation plate having at least two compensation layers and obtained by arranging and bonding the layers so that values of the phase difference and in-plane optical axis directions of the layers are different from each other (see Patent Document 3).

However, since the phase difference compensation plate used in the liquid crystal display device described in Patent Document 3 is formed by bonding the two compensation layers, it requires an adhesive and there is a problem in durability. In addition, two substrates are required, which raises concern about high cost.

Patent Document 1: Japanese Unexamined Patent Application, Publication No. 2006-171327
Patent Document 2: Japanese Unexamined Patent Application, Publication No. 2009-145863
Patent Document 3: PCT International Publication No. WO2008/081919

SUMMARY OF THE INVENTION

The present invention has been made in view of the above background art, and it is an object of the present invention to provide a phase difference compensation element that can improve a contrast of a liquid crystal display device and has durability while suppressing an increase in cost and prolongation of lead time.

The inventors of the present invention found that, when an optical anisotropic layer is formed on a substrate, the aforementioned problem may be solved if the optical anisotropic layer includes a plurality of birefringent films, and a direction of a combined vector obtained by combining respective vectors of the birefringent films when determining a vector with a direction of a line segment obtained by projecting a film formation direction of each birefringent film on a surface of a transparent substrate and a thickness is substantially the same as a direction of a line segment obtained by projecting a liquid crystal molecule constituting a liquid crystal cell on the surface of the transparent substrate, and have completed the present invention.

That is, the present invention is a phase difference compensation element that compensates a phase difference of light generated by a liquid crystal cell, the element including: a transparent substrate; and an optical anisotropic layer including a plurality of birefringent films formed by deposited inorganic material, in which each of the plurality of birefringent films is formed so that an angle formed by a film formation direction of the inorganic material and a surface of the transparent substrate is not 90°, and a direction of a combined vector obtained by combining respective vectors of the plurality of birefringent films when the vector of the birefringent film is determined with a direction of a line segment obtained by projecting the film formation direction of the birefringent film on the surface of the transparent substrate and a thickness of the birefringent film is substantially the same as a direction of a line segment obtained by projecting a liquid crystal molecule constituting the liquid crystal cell on the surface of the transparent substrate.

The plurality of birefringent films may be obliquely vapor-deposited films.

The inorganic material may be an oxide containing at least one selected from the group consisting of Si, Nb, Zr, Ti, La, Ta, Al, Hf, and Ce.

A phase difference providing antireflection layer may be further provided, in which the phase difference providing antireflection layer is a laminate of dielectric films made of two or more kinds of dielectric material having different refractive indices, and the phase difference providing antireflection layer may have an action of antireflection and an action of compensating for a phase difference of light incident obliquely on the liquid crystal cell.

The dielectric film may be at least one selected from the group consisting of $TiO_2$, $SiO_2$, $Ta_2O_5$, $Al_2O_3$, $CeO_2$, $ZrO_2$, $ZrO$, $Nb_2O_5$, and $HfO_2$.

A matching layer may be further provided between the transparent substrate and the optical anisotropic layer.

Further, a protection layer may be further provided.

Another aspect of the present invention is a liquid crystal display device including a liquid crystal cell and the aforementioned phase difference compensation element.

Another aspect of the present invention is a projection type image display device including a light source that emits light, a projection optical system that projects modulated light, and the liquid crystal display device disposed in an optical path between the light source and the projection optical system.

According to the present invention, it is possible to provide a phase difference compensation element that can improve a contrast of a liquid crystal display device while solving the problems of high cost, prolonged lead time, increased mounting space and heat resistance.

BRIEF DESCRIPTION OF THE DRAWINGS

FIGS. 12 and 13 are schematic diagrams in accordance with one or more embodiments.

DETAILED DESCRIPTION OF THE INVENTION

Hereinafter, embodiments of the present invention will be described with reference to the drawings.
[Phase Difference Compensation Element]

A phase difference compensation element of the present invention is a phase difference compensation element that compensates for a phase difference of light generated in a liquid crystal cell, and includes a transparent substrate and an optical anisotropic layer including a plurality of birefringent films made of inorganic material. Each of the plurality of birefringent films is characterized in that an angle formed by a film formation direction of the inorganic material and a surface of the transparent substrate is not 90°, and a direction of a combined vector obtained by combining respective vectors of the plurality of birefringent films when the vector of the birefringent film is determined with a direction of a line segment obtained by projecting the film formation direction of the birefringent film on the surface of the transparent substrate and a thickness of the birefringent film is substantially the same as a direction of a line segment obtained by projecting a liquid crystal molecule on the surface of the transparent substrate.

Figure 1:
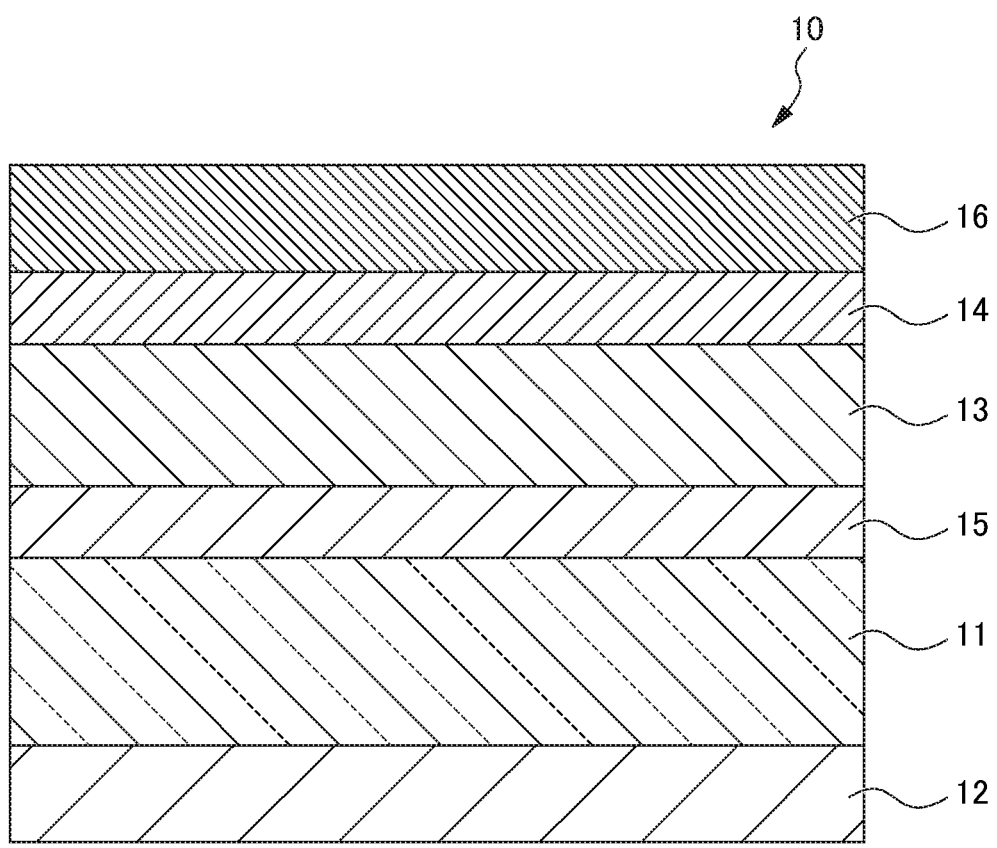
FIG. 1 is a schematic cross-sectional view of a phase difference compensation element according to one embodiment of the present invention.

FIG. 1 is a schematic cross-sectional view of a phase difference compensation element 10 according to one embodiment of the present invention. As illustrated in FIG. 1, the phase difference compensation element 10 according to the present embodiment includes a transparent substrate 11, a phase difference providing antireflection layer 12, an optical anisotropic layer 13, a protection layer 14, a matching layer 15, and an antireflection layer 16. The present invention may only have to include at least a transparent substrate and an optical anisotropic layer including a plurality of birefringent films made of inorganic material.
[Transparent Substrate]

The transparent substrate is not particularly limited as long as it has translucency with respect to light of a desired use wavelength band. Examples of the material of the transparent substrate include glass, quartz, crystal, sapphire, and the like. As a shape of the transparent substrate, a square shape is general, but the shape may be appropriately selected according to a purpose. Further, a thickness of the transparent substrate is preferably in the range of 0.1 to 3.0 mm, for example.

In the phase difference compensation element 10 illustrated in FIG. 1, the transparent substrate 11 is disposed between the phase difference providing antireflection layer 12 and the matching layer 15.
[Optical Anisotropic Layer]

The optical anisotropic layer in the phase difference compensation element of the present invention includes a plurality of birefringent films formed by deposited inorganic material. The optical anisotropic layer has a function of compensating a phase difference in the phase difference compensation element of the present invention and contributes to a contrast improvement.

In the phase difference compensation element 10 illustrated in FIG. 1, the optical anisotropic layer 13 is disposed between the matching layer 15 and the protection layer 14. The optical anisotropic layer 13 is a layer including a plurality of birefringent films.

Figure 2:
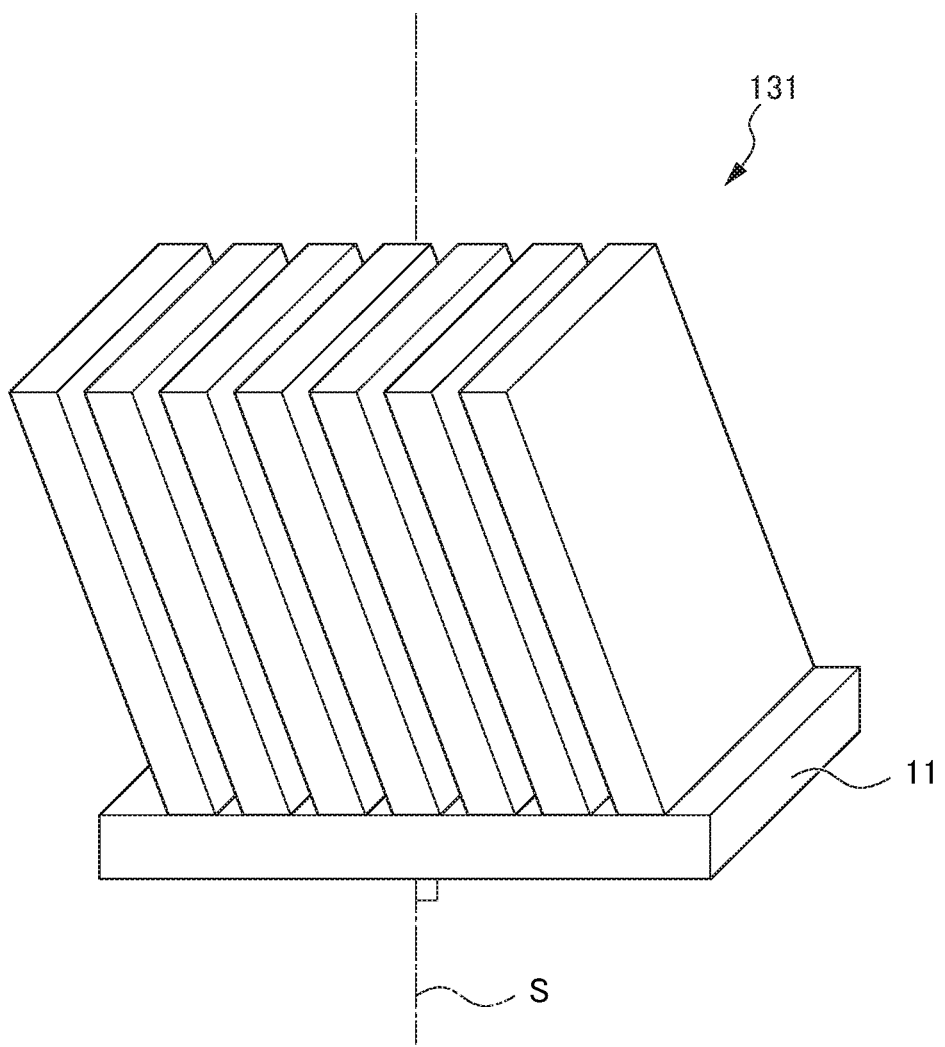
FIG. 2 is a schematic perspective view of birefringent films of the present invention.

FIG. 2 is a schematic view illustrating one embodiment of a birefringent film constituting an optical anisotropic layer. As illustrated in FIG. 2, birefringent films 131 constituting the optical anisotropic layer 13 are constituted by films deposited in a direction tilted with respect to a substrate normal line S which is a direction orthogonal to the surface of the transparent substrate 1 (hereinafter referred to as a substrate normal direction). The optical anisotropic layer in the phase difference compensation element of the present invention has a structure in which a plurality of birefringent films composed of such a film are deposited.

Each of the birefringent films is deposited in a direction tilted with respect to the substrate normal line of the transparent substrate, and an angle defined by a film formation direction of the inorganic material constituting the birefringent film and the surface of the transparent substrate is not 90°.

In the present invention, as a method of setting the angle defined by the film formation direction of the inorganic material and the surface of the transparent substrate not to be 90° with respect to each of the birefringent films, for example, a method is preferable in which a vapor deposition source is disposed at a position tilted with respect to the substrate normal line S and an obliquely vapor-deposited film is formed by an oblique vapor deposition from the vapor deposition source. When the optical anisotropic layer is fabricated by a plurality of oblique vapor depositions, the oblique vapor deposition is repeated by changing a vapor deposition angle to obtain a final optical anisotropic layer.

Further, in the optical anisotropic layer in the phase difference compensation element of the present invention, a direction of a combined vector obtained by combining respective vectors of the plurality of birefringent films constituting the optical anisotropic layer when the vector of the birefringent film is determined with a direction of a line segment obtained by projecting the film formation direction of the birefringent film on the surface of the transparent substrate and a thickness of the birefringent film is substantially the same as a direction of a line segment obtained by projecting a liquid crystal molecule constituting a liquid crystal cell on the surface of the transparent substrate.

In the present invention, "substantially the same" means that it is in the range of ±10°.

Figure 3:
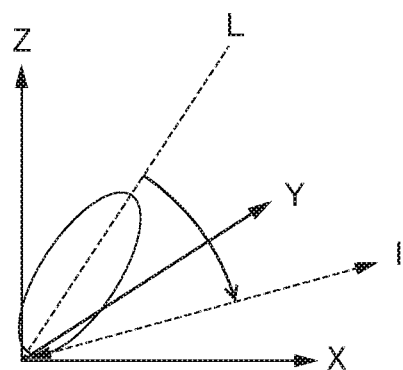
FIG. 3 is a view illustrating a direction of a line segment obtained by projecting a liquid crystal molecule on a surface of a transparent substrate.

FIG. 3 is a view illustrating a direction of a line segment obtained by projecting a liquid crystal molecule on the surface of a transparent substrate. A direction of a line segment obtained by projecting a tilt direction L of the liquid crystal molecule on an XY plane becomes a direction l of the line segment obtained by projecting the liquid crystal molecule on the surface of the transparent substrate.

Figure 4:
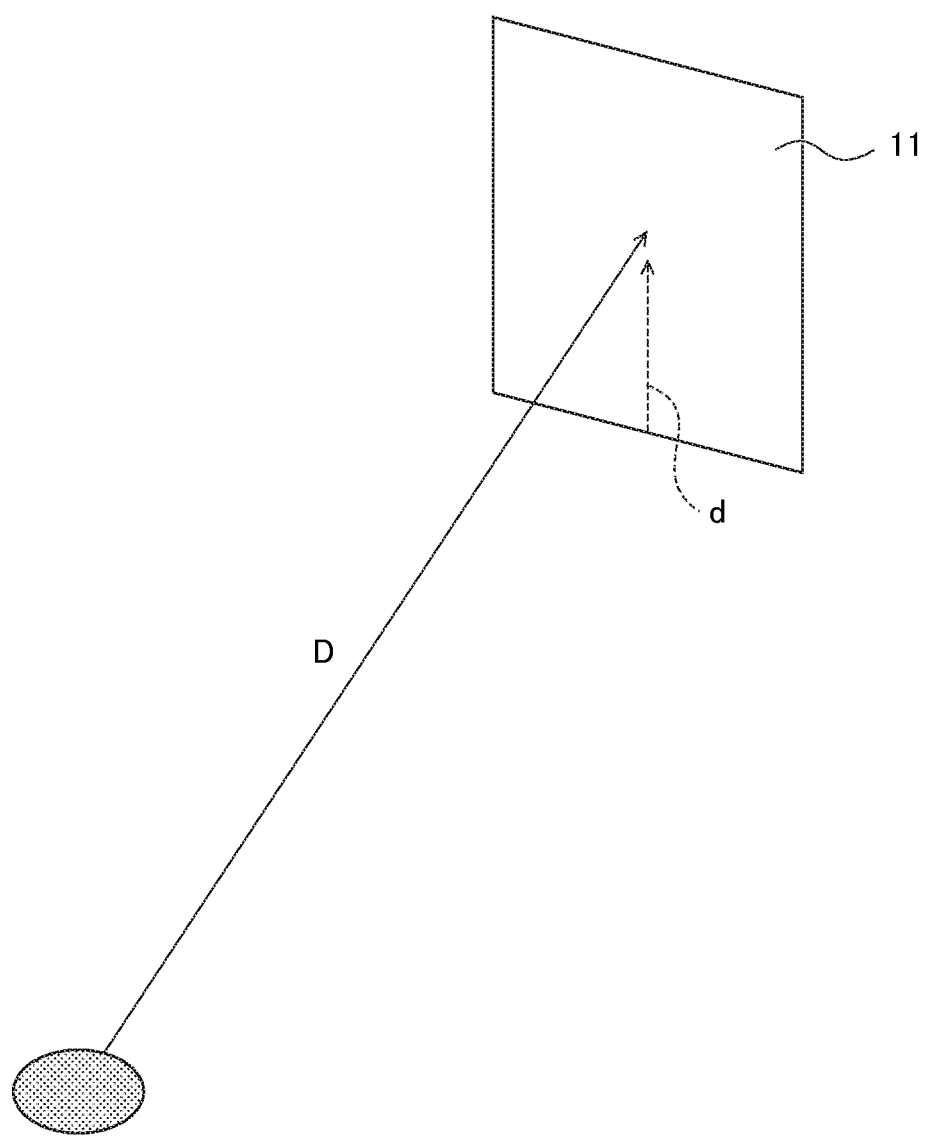
FIG. 4 is a view illustrating a direction of a line segment obtained by projecting a film formation direction of a birefringent film on a surface of a transparent substrate.

FIG. 4 is a view illustrating a direction of a line segment obtained by projecting the film formation direction of the birefringent film on the surface of the transparent substrate. When a vapor-deposited film is formed from the vapor deposition source toward the transparent substrate 11 in a vapor deposition direction D, the direction of the line segment obtained by projecting the film formation direction of the birefringent film on the surface of the transparent substrate is indicated by d. In the optical anisotropic layer of the phase difference compensation element of the present invention, the vector of the birefringent film is determined with the direction d of the projected line segment and the thickness of the birefringent film, and a direction of the combined vector obtained by combining the vectors of the plurality of birefringent films is substantially the same as the direction l of the line segment obtained by projecting the liquid crystal molecule constituting the liquid crystal cell on the surface of the transparent substrate.

The optical anisotropic layer includes a plurality of birefringent films made of inorganic material. As the inorganic material, dielectric material is preferable, for example, an oxide containing at least one selected from the group consisting of Si, Nb, Zr, Ti, La, Ta, Al, Hf, and Ce. Further, $Ta_2O_5$ is preferable as a main component, and material in which 5 to 15% by mass of $TiO_2$ is added to $Ta_2O_5$ is more preferable.

Further, in the case where the birefringent film constituting the optical anisotropic layer of the present invention is formed by oblique vapor deposition, it is possible to change the deposition direction by rotating the transparent substrate at a predetermined angle in the in-plane direction.

In the present invention, material or composition of the plurality of birefringent films constituting the optical anisotropic layer are the same. Further, a phase difference of each of the plurality of birefringent films is not particularly limited, and is optimized according to the liquid crystal cell.

A thickness of each of the birefringent films constituting the optical anisotropic layer is not particularly limited as long as the direction of the combined vector obtained by combining the vectors of the birefringent films is substantially the same as the direction of the line segment obtained by projecting the liquid crystal molecule on the surface of the transparent substrate, and it is optimized according to the liquid crystal cell. In the present specification, the thickness (film thickness) of the layer means an average film thickness.

A thickness of the entire optical anisotropic layer including a plurality of birefringent films is not particularly limited as long as the direction of the combined vector obtained by combining the vectors of the birefringent films is substantially the same as the direction of the line segment obtained by projecting the liquid crystal molecule on the surface of the transparent substrate, and it is optimized according to the liquid crystal cell.

[Phase Difference Providing Antireflection Layer]

In the present invention, the phase difference providing antireflection layer is an arbitrary layer and is a laminate of dielectric films composed of two or more kinds of dielectric material having different refractive indices. The phase difference providing antireflection layer has an action of antireflection and an action of compensating a phase difference of light incident obliquely on the liquid crystal cell. In other words, the phase difference providing antireflection layer is positioned so as to compensate for a deviation of the phase difference of the obliquely incident light generated in the liquid crystal panel and to prevent reflection simultaneously.

In the case where the phase difference providing antireflection layer is provided, it is provided on the surface of the transparent substrate facing the surface on which the optical anisotropic layer is provided.

Figure 5:
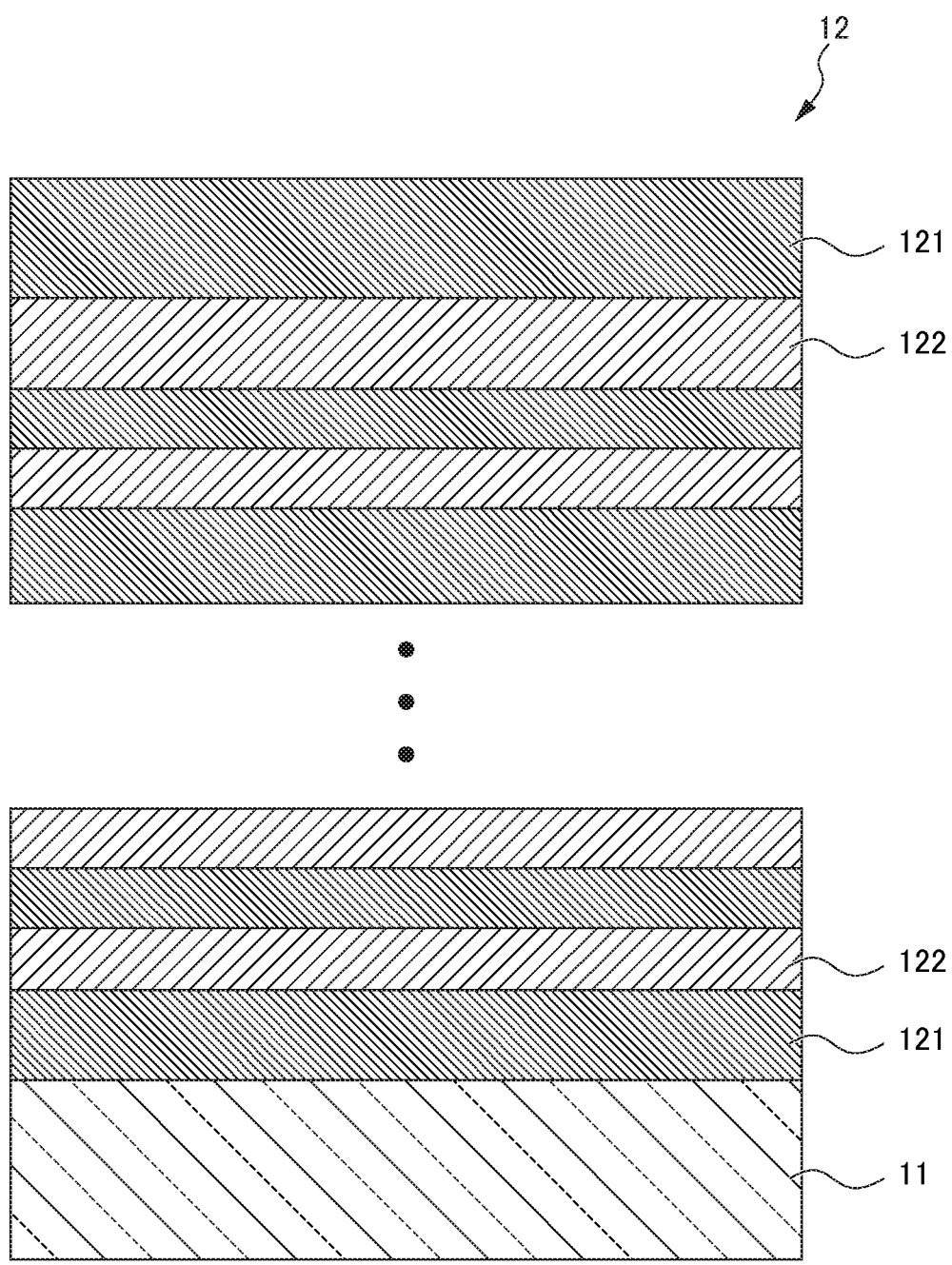
FIG. 5 is a schematic cross-sectional view of a phase difference providing antireflection layer according to one embodiment of the present invention.

FIG. 5 is a schematic cross-sectional view of a phase difference providing antireflection layer according to one embodiment of the present invention. The phase difference providing antireflection layer 12 illustrated in FIG. 5 is a multilayer film formed by laminating two types of dielectric films having different refractive indices. In the present embodiment, the phase difference providing antireflection layer 12 is formed of a dielectric multilayer film in which a first dielectric film 121 and a second dielectric film 122 are alternately laminated. Although there is no particular limitation on the number of layers, for example, a dielectric multilayer film composed of a total of 34 layers in which the first dielectric film 121 and the second dielectric film 122 are alternately laminated may be cited.

As the material for forming the dielectric film composed of two or more kinds of dielectric material having different refractive indices constituting the phase difference providing antireflection layer, at least one inorganic oxide selected from the group consisting of $TiO_2$, $SiO_2$, $Ta_2O_5$, $Al_2O_3$, $CeO_2$, $ZrO_2$, $ZrO$, $Nb_2O_3$, and $HfO_2$ may be cited. For example, in the phase difference providing antireflection layer 12 according to the embodiment illustrated in FIG. 5, it is preferable that a first dielectric film 121 is formed of $Nb_2C_5$ having a relatively high refractive index and a second dielectric film 122 is formed of $SiO_2$ having a relatively low refractive index.

Here, since film thicknesses of the dielectric films constituting the phase difference providing antireflection layer are different from each other in the present invention, the phase difference providing antireflection layer functions as an antireflection film using an interference effect of light (multiple reflection) while compensating for the phase difference of obliquely incident light incident obliquely on the liquid crystal cell by utilizing a structural birefringence. Further, it is possible to make the number of lamination relatively small.

It is preferable to design the phase difference providing antireflection layer so that the phase difference to be provided to the obliquely incident light tilted at 15° with respect to the direction orthogonal to the surface of the transparent substrate (substrate normal direction) is 1.0 to 25.0 nm. By setting the film thickness of each dielectric film to be different and optimizing the number of lamination so that the phase difference is in such a range, a practical phase difference providing antireflection layer is obtained. Therefore, the thickness of the phase difference providing antireflection layer may only have to be a thickness necessary for obtaining a desired phase difference, and is not particularly limited.

[Matching Layer]

The matching layer is an arbitrary layer in the present invention and is a layer for preventing reflection at an interface between the transparent substrate and the optical anisotropic layer. The matching layer is provided between the transparent substrate and the optical anisotropic layer, and is, for example, a multilayer film of dielectric material. The matching layer is designed to cancel light reflected at an interface between the transparent substrate and the matching layer and light reflected at an interface between the matching layer and the optical anisotropic layer are canceled.

The matching layer 15 in the phase difference compensation element 10 in FIG. 1 is disposed between the transparent substrate 11 and the optical anisotropic layer 13. Due to the presence of the matching layer 15, the phase difference compensation element 10 is an element in which reflection is further prevented.

[Protection Layer]

The protection layer is an arbitrary layer in the present invention, and is provided to prevent warp of the phase difference compensation element and to improve moisture resistance of the optical anisotropic layer. The material of the protection layer is not particularly limited as long as a stress applied to the phase difference compensation element can be adjusted and it contributes to improvement in moisture resistance. For example, a thin film of $SiO_2$ and the like may be cited.

The protection layer 14 of the phase difference compensation element 10 in FIG. 1 is disposed between the optical anisotropic layer 13 and the antireflection layer 16. In the case of providing the protection layer, it is preferable to dispose the protection layer on the optical anisotropic layer in the phase difference compensation element.

[Antireflection Layer]

The antireflection layer is provided as necessary and is a layer having an antireflection function in a desired use wavelength band. The antireflection layer is, for example, obtained by laminating dielectric films, and the dielectric and the number of layers to be used can be appropriately determined according to required characteristics and productivity.

The antireflection layer 16 in the phase difference compensation element 10 in FIG. 1 is provided so as to be the outermost part of the side provided with the optical anisotropic layer 13, the matching layer 15, and the protection layer 14.

[Liquid crystal display device]

In FIG. 12, a liquid crystal display device 1210 of the present invention is shown that includes a liquid crystal cell 1220 and the aforementioned phase difference compensation element 1230 of the present invention. In the present invention, it is preferable that the liquid crystal cell is in a VA mode.

The VA mode liquid crystal cell is a vertical orientation type liquid crystal cell, and liquid crystal molecules in a non-voltage-applied state are oriented with being tilted in a certain direction with respect to a normal direction of a substrate surface. Such a tilted angle is called a pretilt angle, but the phase difference compensation element of the present invention is characterized in that the direction of the combined vector obtained by synthesizing vectors of the plurality of birefringent films constituting the optical anisotropic layer is substantially the same as the direction of a line segment obtained by projecting the liquid crystal molecule on the surface of the transparent substrate.

According to the present invention, by arranging only one phase difference compensation element between an incident side polarization plate and the liquid crystal cell on the optical path having the liquid crystal cell or between the liquid crystal cell and an exit side polarization plate, it is possible to increase the contrast of the liquid crystal display device without particularly adjusting an angle of the phase difference compensation element, thus obtaining a sufficient optical compensation effect.

[Projection type image display device]

Further, in FIG. 13, a projection type image display device 1310 of the present invention includes a light source 1320 that emits light, a projection optical system 1330 that projects modulated light, the aforementioned liquid crystal display device 1340 disposed on an optical path between the light source 1320 and the projection optical system 1330.

The light source emits light and, for example, an ultra high-pressure mercury lamp which emits white light and the like may be cited as the light source. The projection optical system projects the modulated light and, for example, a projection lens that projects modulated light onto a screen, and the like may be cited as the projection optical system. The liquid crystal display device including the VA mode liquid crystal cell and the phase difference compensation element of the present invention is disposed on the optical path between the light source and the projection optical system.

The present invention is not limited to the aforementioned embodiments, and modifications and improvements within a scope where the object of the present invention can be achieved are included in the present invention.

EXAMPLES

Next, examples of the present invention will be described, but the present invention is not limited to these examples.

Example 1

[Fabrication of Phase Difference Compensation Element]
(Fabrication of Matching Layer)

A glass substrate (having an average thickness of 0.7 mm) was prepared and three layers of $SiO_2/Nb_2O_5/SiO_2$ were laminated on one surface of the substrate by a sputtering method, thereby forming a matching layer.

(Fabrication of Phase Difference Providing Antireflection Layer)

Subsequently, 34 layers were alternately laminated on the other surface of the glass substrate by the sputtering method using $Nb_2O_5$ and $SiO_2$, thereby forming a phase difference providing antireflection layer. The provided phase difference was made 7.0 nm with respect to incident light tilted at 15° from a normal direction of the substrate.

(Fabrication of Optical Anisotropic Layer)

A vapor deposition source was disposed at a position tilted at an angle of 70° with respect to the substrate normal direction using a mixture of $Ta_2O_5$ and $TiO_2$ as vapor deposition material on the matching layer, a plurality of vapor deposition processes were performed by oblique vapor deposition, an optical anisotropic layer was fabricated by fabricating a plurality of birefringent films, whereby a phase difference compensation element was obtained.

Figure 6:
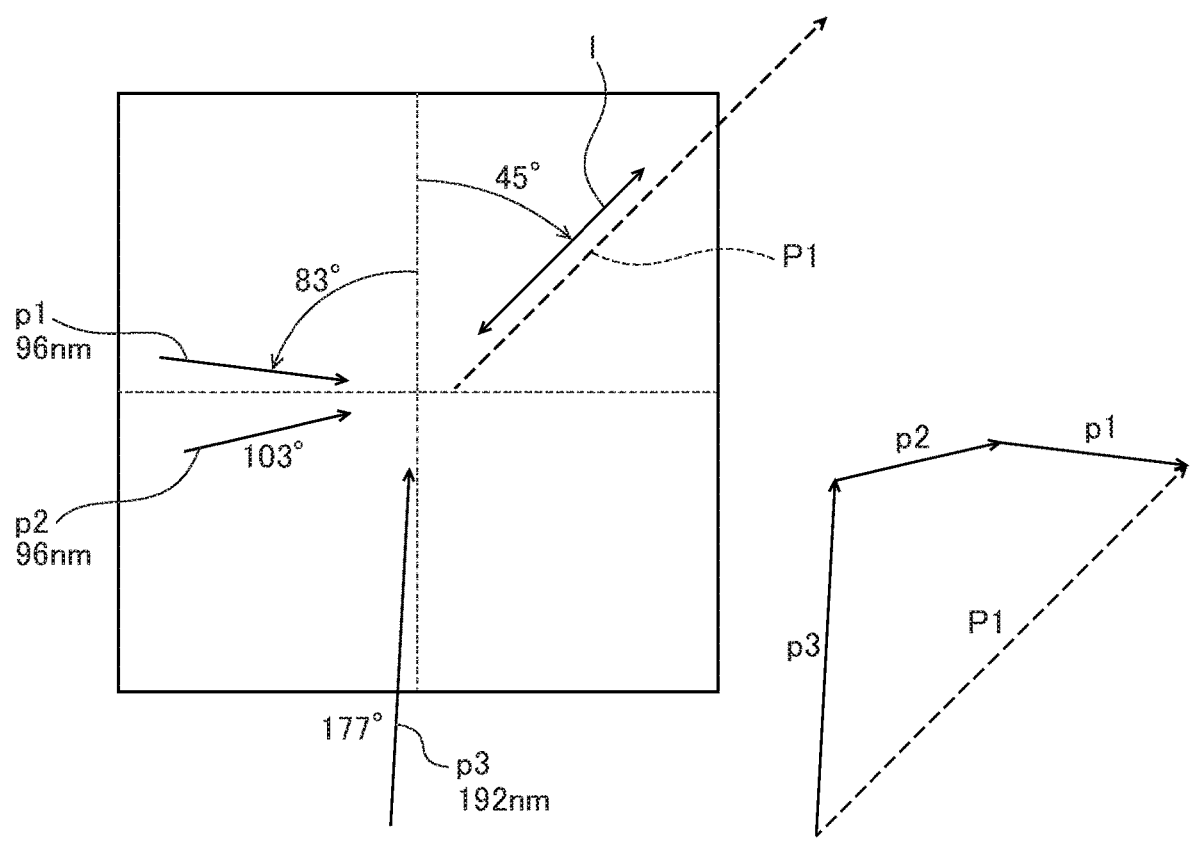
FIG. 6 is a view illustrating vectors of birefringent films of a first embodiment.

FIG. 6 illustrates an angle in an in-plane direction and a thickness of a vapor-deposited film of each vapor deposition process. In a vapor deposition process 1, as illustrated in FIG. 6, in the case where an xy axis was defined on a vapor deposition surface and a counterclockwise direction from a center is defined as +, the oblique vapor deposition with a film thickness of 96 nm from a direction of 83° was performed to fabricate a birefringent film 1. Subsequently, a vapor deposition with a film thickness of 96 nm from a direction of 103° was performed as a vapor deposition process 2 to fabricate a birefringent film 2, and an oblique vapor deposition with a film thickness of 192 nm from a direction of 177° was performed as a vapor deposition process 3 to fabricate a birefringent film 3, whereby, an optical anisotropic layer having three birefringent films was finally obtained.

A combined vector P1 obtained by combining a vector p1 of the birefringent film 1, a vector p2 of the birefringent film 2, and a vector p3 of the birefringent film 3 is the same as a direction l of a line segment obtained by projecting a liquid crystal molecule on a surface of a transparent substrate, as illustrated in FIG. 6. An in-plane vapor deposition angle and a vapor deposition film thickness of the fabricated birefringent film are illustrated in Table 1.

TABLE 1

| | In-plane vapor deposition angle | Vapor deposition film thickness |
|---|---|---|
| Vapor deposition process 1 | −83° | 96 nm |
| Vapor deposition process 2 | −103° | 96 nm |
| Vapor deposition process 3 | −177° | 192 nm |

Comparative Example 1

The phase difference compensation element was fabricated in the same manner as Example 1, except that the oblique vapor deposition was performed with the vapor deposition angle of the vapor deposition process 1 in Example 1 being changed by 1° in a range of ±5° from 83° which is the in-plane vapor deposition angle of Example 1.

Comparative Example 2

The phase difference compensation element was fabricated in the same manner as Example 1, except that the vapor deposition was performed with the vapor deposition angle of the vapor deposition process 2 in Example 1 being changed by 1° in a range of ±5° from 103° which is the in-plane vapor deposition angle of Example 1.

Comparative Example 3

The phase difference compensation element was fabricated in the same manner as Example 1, except that the vapor deposition was performed with the vapor deposition angle of the vapor deposition process 3 in Example 1 being changed by 1° in a range of ±5° from 177° which is the in-plane vapor deposition angle of Example 1.

Comparative Example 4

The phase difference compensation element was fabricated in the same manner as Example 1, except that the vapor deposition was performed with the vapor deposition film thickness of the vapor deposition process 1 in Example 1 being changed by 1 nm in a range of ±5 nm from 96 nm which is the vapor deposition film thickness of Example 1.

Comparative Example 5

The phase difference compensation element was fabricated in the same manner as Example 1, except that the vapor deposition was performed with only the vapor deposition film thickness of the vapor deposition process 2 in Example 1 being changed by 1 nm in a range of ±5 nm from 96 nm which is the vapor deposition film thickness of Example 1.

Comparative Example 6

The phase difference compensation element was fabricated in the same manner as Example 1, except that the vapor deposition was performed with only the vapor deposition film thickness of the vapor deposition process 3 in Example 1 being changed by 1 nm in a range of ±5 nm from 192 nm which is the vapor deposition film thickness of Example 1.

[Measurement of Contrast]

Figure 7A:
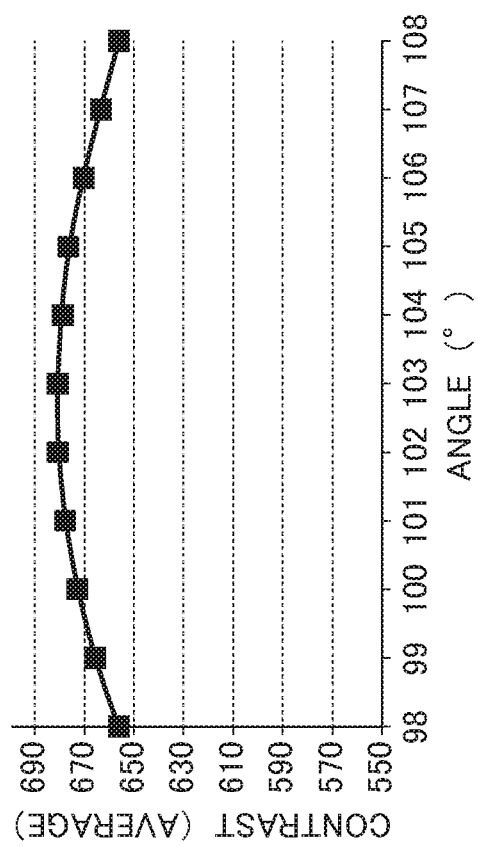
FIGS. 7A to 7C are diagrams illustrating a relationship between a direction of a vector and a contrast of each birefringent film of the first embodiment.
Figure 7B:
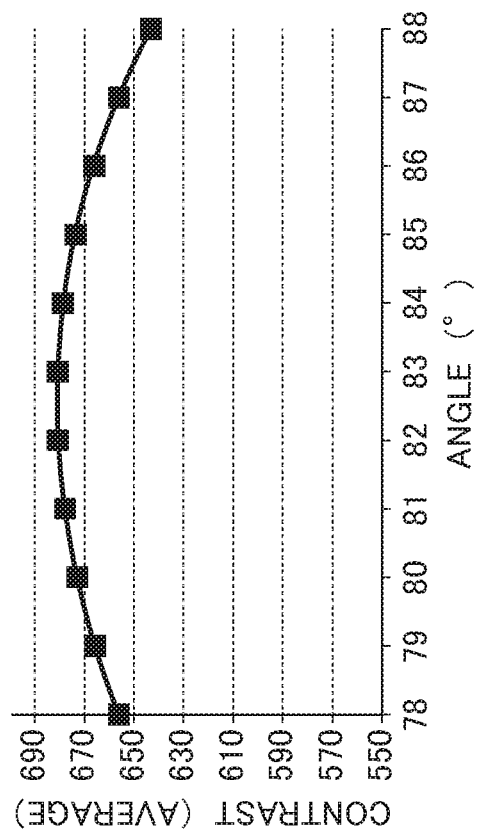
Figure 7C:
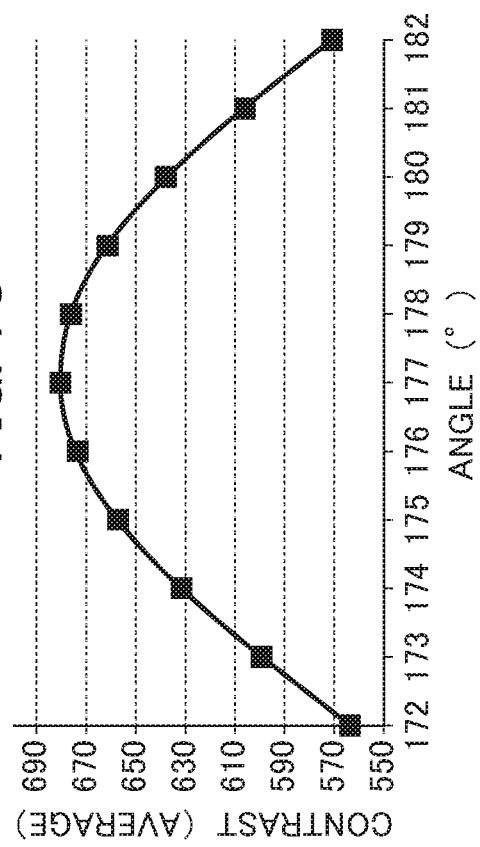

For the phase difference compensation element obtained in Example 1 and Comparative Examples 1 to 3, the contrast was measured. The results are illustrated in FIGS. 7A to 7C. It is understood that the contrast is lowered when it deviates from the vapor deposition angle in the in-plane direction in Example 1.

Figure 8A:
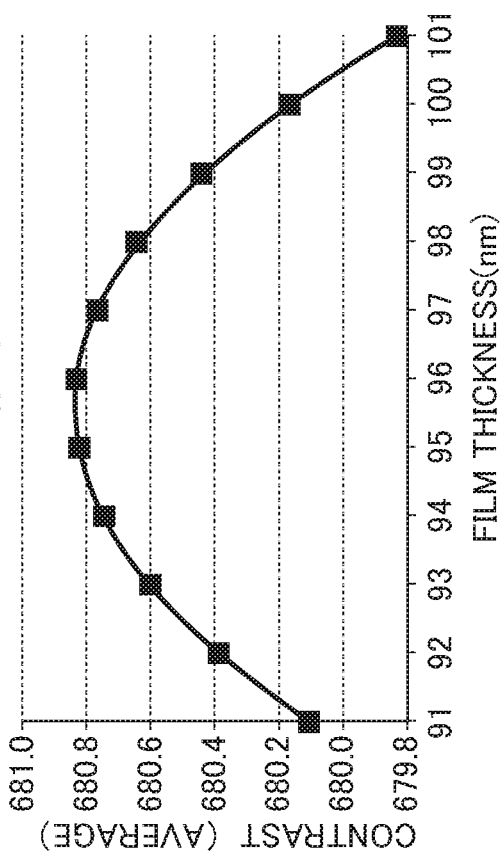
FIGS. 8A to 8C are diagrams illustrating a relationship between a thickness and the contrast of each birefringent film of the first embodiment.
Figure 8B:
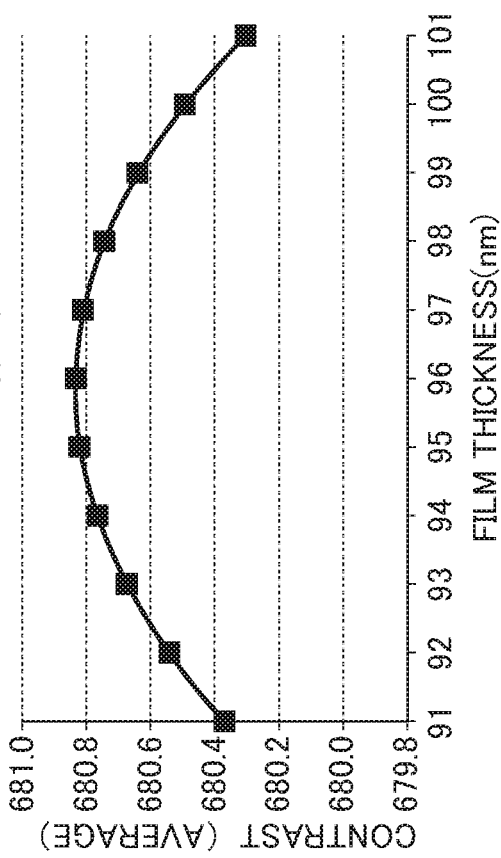
Figure 8C:
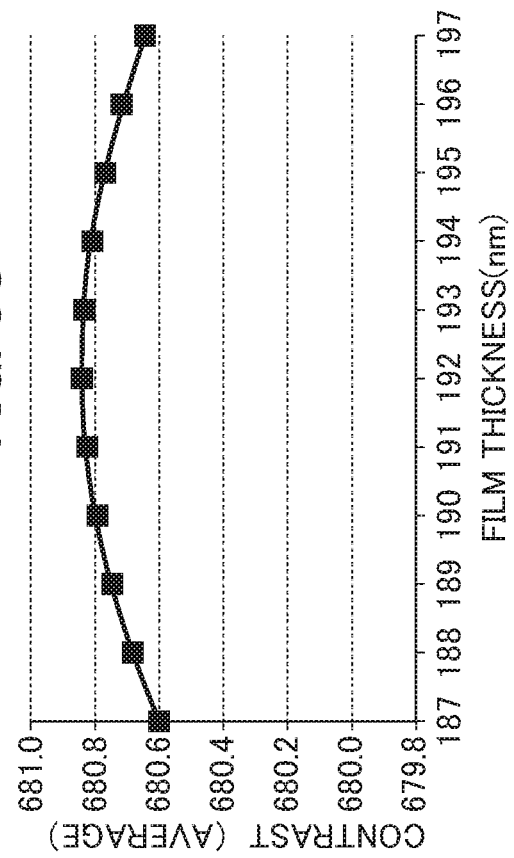

For the phase difference compensation elements obtained in Example 1 and Comparative Examples 4 to 6, contrasts were measured. The results are illustrated in FIGS. 8A to 8C. It is understood that the contrast is lowered when it deviates from the film thickness in the in-plane direction in Example 1.

Example 2

Figure 9:
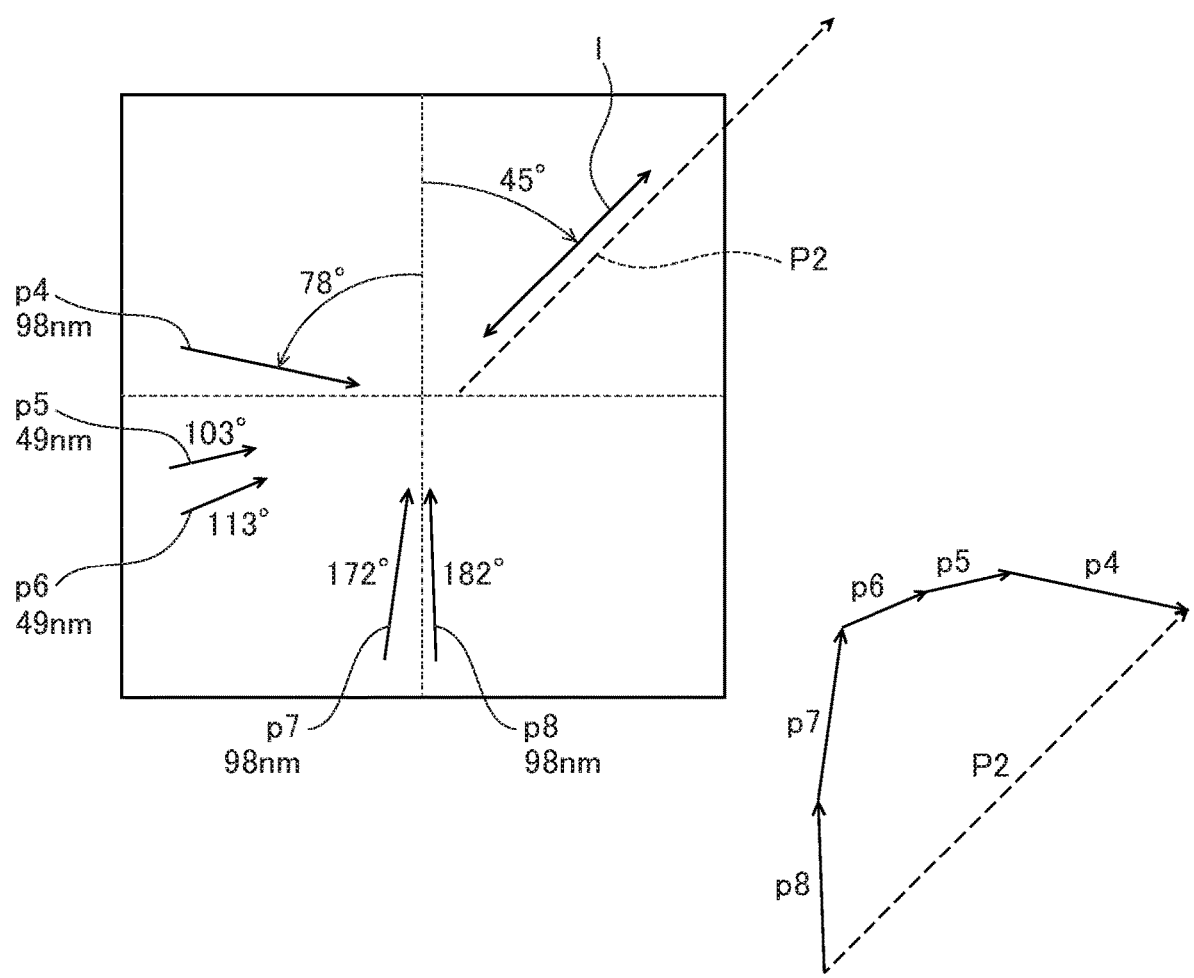
FIG. 9 is a diagram illustrating vectors of birefringent films of a second embodiment.
Figure 10A:
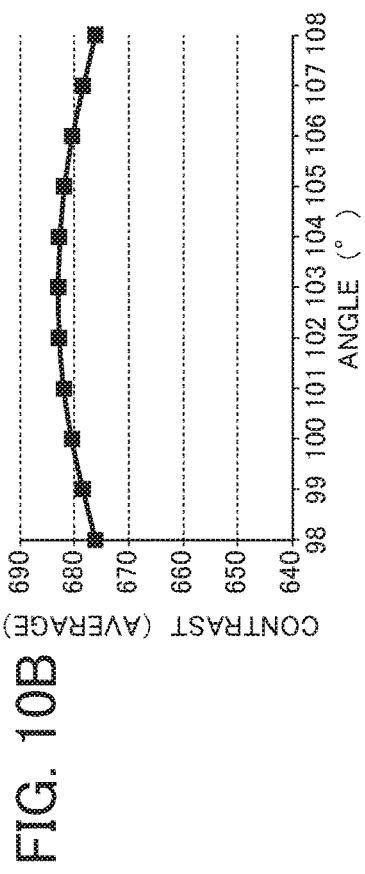
FIGS. 10A to 10E are diagrams illustrating a relationship between a direction of a vector and a contrast of each birefringent film of the second embodiment.
Figure 10B:
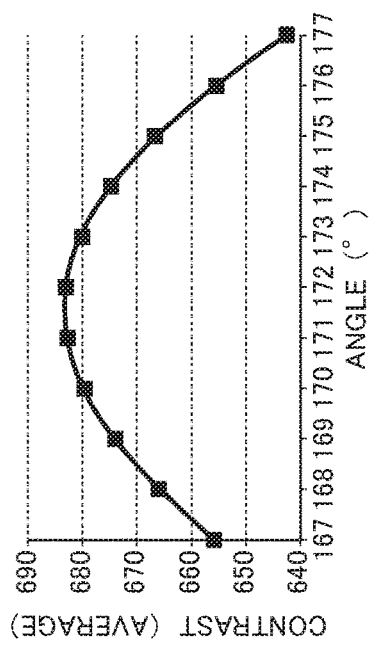
Figure 10C:
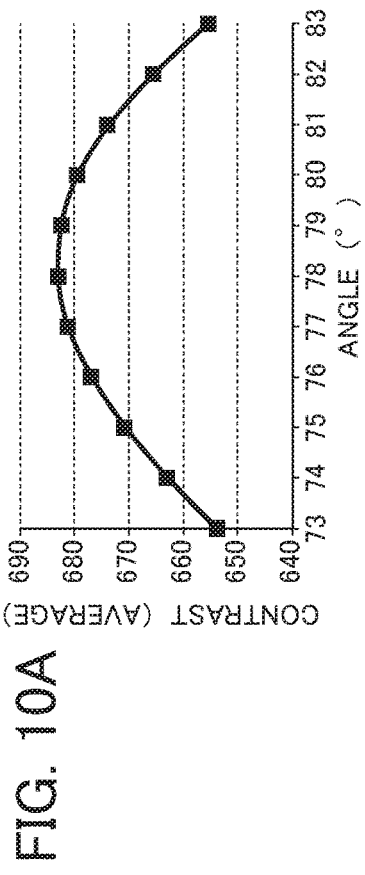
Figure 10D:
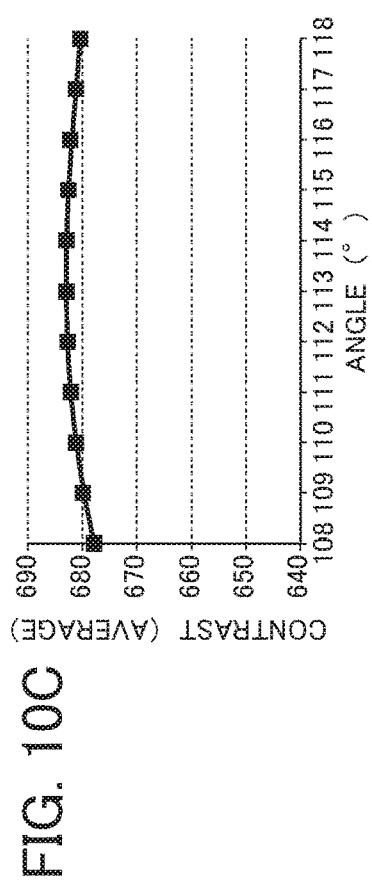
Figure 10E:
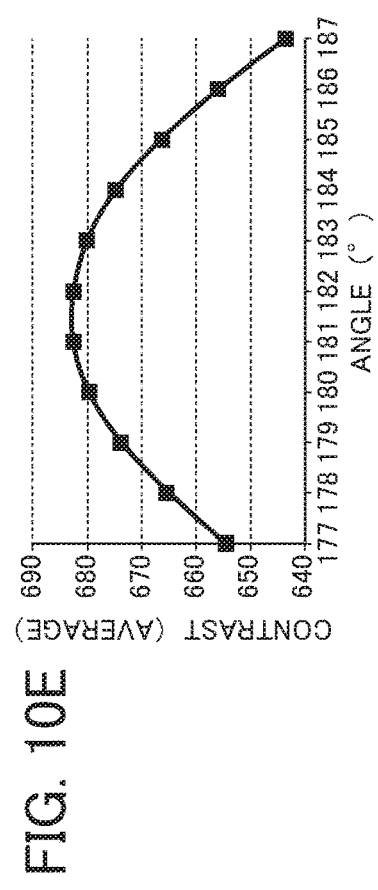
Figure 11A:
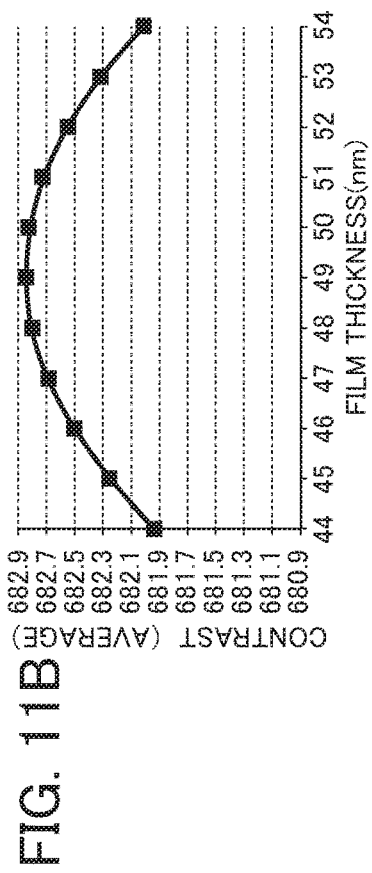
FIGS. 11A to 11E are diagrams illustrating a relationship between a thickness and the contrast of each birefringent film of the first embodiment.
Figure 11B:
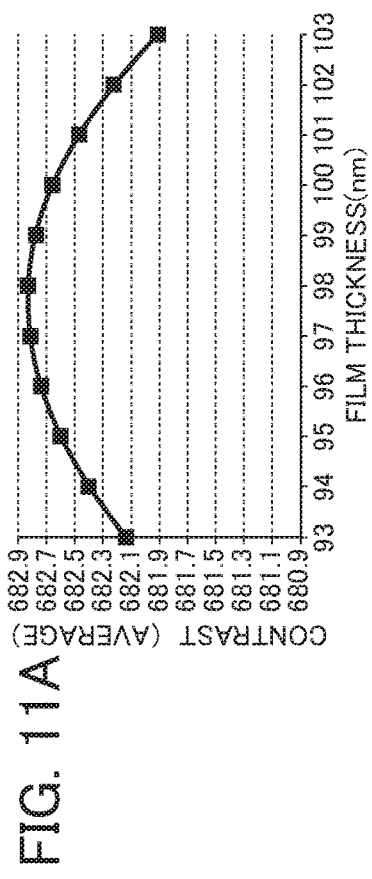
Figure 11C:
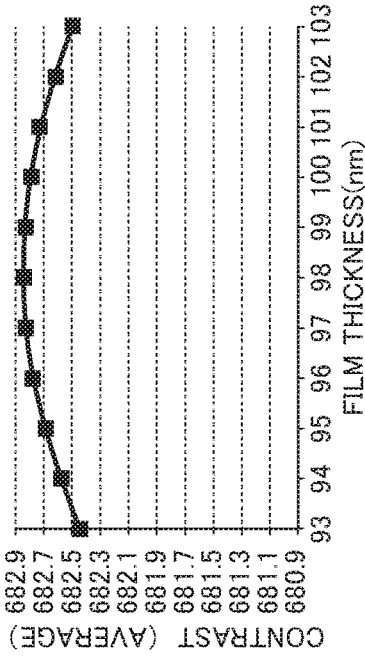
Figure 11D:
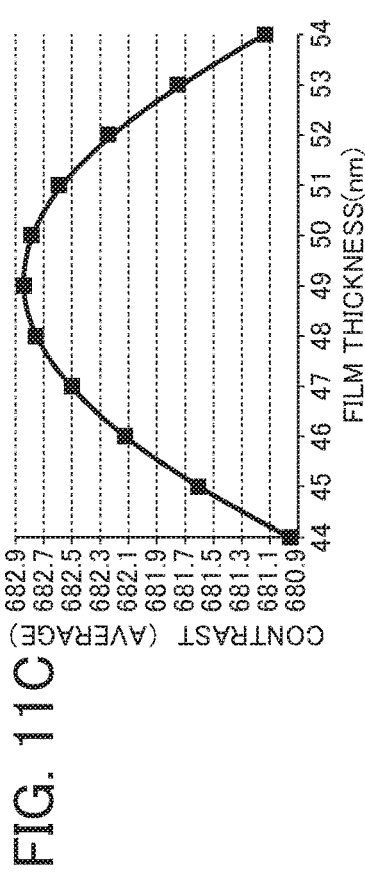
Figure 11E:
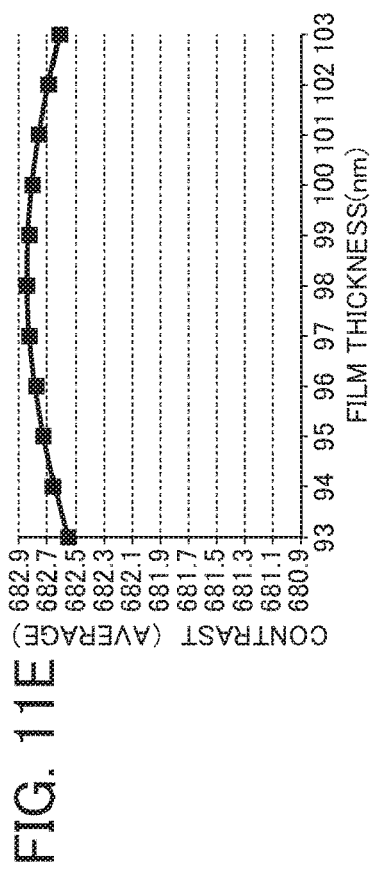

The phase difference compensation element was fabricated in the same manner as in Example 1, except that the vapor deposition process for fabricating the birefringent film constituting the optical anisotropic layer was changed as illustrated in FIG. 9 and Table 2.

In Example 2, a birefringent film 4 was fabricated by performing an oblique vapor deposition, as a vapor deposition process 4, with a film thickness from a direction of 78° being 98 nm. Subsequently, a birefringent film 5 was fabricated by performing a vapor deposition as a vapor deposition process 5 with a film thickness from a direction of 103° being 49 nm, a birefringent film 6 was fabricated by performing a vapor deposition as a vapor deposition process 6 with a film thickness from a direction of 113° being 49 nm, a birefringent film 7 was fabricated by performing a vapor deposition as a vapor deposition process 7 with a film thickness from a direction of 172° being 98 nm, and a birefringent film 8 was fabricated by performing an oblique vapor deposition as a vapor deposition process 8 with a film thickness from a direction of 182° being 98 nm, whereby an optical anisotropic layer having five birefringent films was finally obtained.

The combined vector P2 obtained by combining the vector p4 of the birefringent film 4, the vector p5 of the birefringent film 5, the vector p6 of the birefringent film 6, the vector p7 of the birefringent film 7, and the vector p8 of the birefringent film 8 is the same as the direction l of the line segment obtained by projecting the liquid crystal molecule on the surface of the transparent substrate, as illustrated in FIG. 9. The in-plane vapor deposition angle and the vapor deposition film thickness of the fabricated birefringent film are illustrated in Table 2.

TABLE 2

|  | In-plane vapor deposition angle | Vapor deposition film thickness |
| --- | --- | --- |
| Vapor deposition process 4 | −78° | 98 nm |
| Vapor deposition process 5 | −103° | 49 nm |
| Vapor deposition process 6 | −113° | 49 nm |
| Vapor deposition process 7 | −172° | 98 nm |
| Vapor deposition process 8 | −182° | 98 nm |

Comparative Example 7

The phase difference compensation element was fabricated in the same manner as Example 2, except that the vapor deposition was performed with the vapor deposition angle of the vapor deposition process 4 in Example 2 being changed by 1° in a range of ±5° from 78° which is the in-plane vapor deposition angle of Example 2.

Comparative Example 8

The phase difference compensation element was fabricated in the same manner as Example 2, except that the vapor deposition was performed with the vapor deposition angle of the vapor deposition process 5 in Example 2 being changed by 1° in a range of ±5° from 103° which is the in-plane vapor deposition angle of Example 2.

Comparative Example 9

The phase difference compensation element was fabricated in the same manner as Example 2, except that the vapor deposition was performed with the vapor deposition angle of the vapor deposition process 6 in Example 2 being changed by 1° in a range of ±5° from 113° which is the in-plane vapor deposition angle of Example 2.

Comparative Example 10

The phase difference compensation element was fabricated in the same manner as Example 2, except that the vapor deposition was performed with the vapor deposition angle of the vapor deposition process 7 in Example 2 being changed by 1° in a range of ±5° from 172° which is the in-plane vapor deposition angle of Example 2.

Comparative Example 11

The phase difference compensation element was fabricated in the same manner as Example 2, except that the vapor deposition was performed with the vapor deposition angle of the vapor deposition process 8 in Example 2 being changed by 1° in a range of ±5° from 182° which is the in-plane vapor deposition angle of Example 2.

Comparative Example 12

The phase difference compensation element was fabricated in the same manner as Example 2, except that the vapor deposition was performed with the vapor deposition film thickness of the vapor deposition process 4 in Example 2 being changed by 1 nm in a range of ±5 nm from 98 nm which is the vapor deposition film thickness of Example 2.

Comparative Example 13

The phase difference compensation element was fabricated in the same manner as Example 2, except that the vapor deposition was performed with the vapor deposition film thickness of the vapor deposition process 5 in Example 2 being changed by 1 nm in a range of ±5 nm from 49 nm which is the vapor deposition film thickness of Example 2.

Comparative Example 14

The phase difference compensation element was fabricated in the same manner as Example 2, except that the vapor deposition was performed with the vapor deposition film thickness of the vapor deposition process 6 in Example 2 being changed by 1 nm in a range of ±5 nm from 49 nm which is the vapor deposition film thickness of Example 2.

Comparative Example 15

The phase difference compensation element was fabricated in the same manner as Example 2, except that the vapor deposition was performed with the vapor deposition film thickness of the vapor deposition process 7 in Example 2 being changed by 1 nm in a range of ±5 nm from 98 nm which is the vapor deposition film thickness of Example 2.

Comparative Example 16

The phase difference compensation element was fabricated in the same manner as Example 2, except that the vapor deposition was performed with the vapor deposition film thickness of the vapor deposition process 8 in Example 2 being changed by 1 nm in a range of ±5 nm from 98 nm which is the vapor deposition film thickness of Example 2.

[Measurement of Contrast]

Results of measuring contrasts of the phase difference compensation elements of Example 2 and Comparative Examples 7 to 11 are illustrated in FIGS. 10A to 10E. It is understood that the contrast is lowered when it deviates from the vapor deposition angle in the in-plane direction in Example 2.

Results of measuring contrasts of the phase difference compensation elements of Example 2 and Comparative Examples 12 to 16 are illustrated in FIGS. 11A to 11E. It is understood that the contrast is lowered when it deviates from the film thickness in Example 2.

EXPLANATION OF REFERENCE NUMERALS

10 PHASE DIFFERENCE COMPENSATION ELEMENT
11 TRANSPARENT SUBSTRATE
12 PHASE DIFFERENCE PROVIDING ANTIREFLECTION LAYER
121 FIRST DIELECTRIC FILM
122 SECOND DIELECTRIC FILM
13 OPTICAL ANISOTROPIC LAYER
131 BIREFRINGENT FILM
14 PROTECTION LAYER
15 MATCHING LAYER
S SUBSTRATE NORMAL LINE
L TILT DIRECTION OF LIQUID CRYSTAL MOLECULE
L DIRECTION OF LINE SEGMENT OBTAINED BY PROJECTING LIQUID CRYSTAL MOLECULE ON SURFACE OF TRANSPARENT SUBSTRATE
D FILM FORMATION DIRECTION OF BIREFRINGENT FILM
D DIRECTION OF LINE SEGMENT OBTAINED BY PROJECTING FILM FORMATION DIRECTION OF BIREFRINGENT FILM ON SURFACE OF TRANSPARENT SUBSTRATE
p1 VECTOR OF BIREFRINGENT FILM 1
p2 VECTOR OF BIREFRINGENT FILM 2
p3 VECTOR OF BIREFRINGENT FILM 3
P1 COMBINED VECTOR OF BIREFRINGENT FILMS OF EXAMPLE 1
p4 VECTOR OF BIREFRINGENT FILM 4
p5 VECTOR OF BIREFRINGENT FILM 5
p6 VECTOR OF BIREFRINGENT FILM 6
p7 VECTOR OF BIREFRINGENT FILM 7
p8 VECTOR OF BIREFRINGENT FILM 8
P2 COMBINED VECTOR OF BIREFRINGENT FILMS OF EXAMPLE 2

What is claimed is:

1. A phase difference compensation element that compensates a phase difference of light generated by a liquid crystal cell, the element comprising:
    a transparent substrate; and
    an optical anisotropic layer including a plurality of birefringent films formed by deposited inorganic material,
    wherein each of the plurality of birefringent films is formed so that an angle formed by a film formation direction of the inorganic material and a surface of the transparent substrate is not 90°, and
    a direction of a line segment obtained by projecting a combined vector on the surface of the transparent substrate, the combined vector obtained by combining a plurality of respective vectors of the plurality of birefringent films, wherein a respective vector of a birefringent film among the plurality of respective vectors is determined with a direction of a line segment obtained by projecting the film formation direction of the birefringent film on the surface of the transparent substrate and a thickness of the birefringent film is substantially the same as a direction of a line segment obtained by projecting a liquid crystal molecule in a non-voltage-applied state constituting the liquid crystal cell on the surface of the transparent substrate.

2. The phase difference compensation element according to claim 1, wherein the plurality of birefringent films are obliquely vapor-deposited films.

3. The phase difference compensation element according to claim 2, wherein the inorganic material is an oxide containing at least one selected from the group consisting of Si, Nb, Zr, Ti, La, Ta, Al, Hf, and Ce.

4. The phase difference compensation element according to claim 3, further comprising a phase difference providing antireflection layer,
    wherein the phase difference providing antireflection layer is a laminate of dielectric films made of two or more kinds of dielectric material having different refractive indices, and the phase difference providing antireflection layer has an action of antireflection and an action of compensating for a phase difference of light incident obliquely on the liquid crystal cell.

5. The phase difference compensation element according to claim 2, further comprising a phase difference providing antireflection layer,
    wherein the phase difference providing antireflection layer is a laminate of dielectric films made of two or more kinds of dielectric material having different refractive indices, and the phase difference providing antireflection layer has an action of antireflection and an action of compensating for a phase difference of light incident obliquely on the liquid crystal cell.

6. The phase difference compensation element according to claim 2, comprising a matching layer provided between the transparent substrate and the optical anisotropic layer.

7. The phase difference compensation element according to claim 2, further comprising a protection layer.

8. A liquid crystal display device comprising:
    a liquid crystal cell; and
    the phase difference compensation element according to claim 2.

9. The phase difference compensation element according to claim 1, wherein the inorganic material is an oxide containing at least one selected from the group consisting of Si, Nb, Zr, Ti, La, Ta, Al, Hf, and Ce.

10. The phase difference compensation element according to claim 9, further comprising a phase difference providing antireflection layer,
    wherein the phase difference providing antireflection layer is a laminate of dielectric films made of two or more kinds of dielectric material having different refractive indices, and the phase difference providing antireflection layer has an action of antireflection and an action of compensating for a phase difference of light incident obliquely on the liquid crystal cell.

11. The phase difference compensation element according to claim 9, comprising a matching layer provided between the transparent substrate and the optical anisotropic layer.

12. The phase difference compensation element according to claim 9, further comprising a protection layer.

13. A liquid crystal display device comprising:
    a liquid crystal cell; and
    the phase difference compensation element according to claim 9.

14. The phase difference compensation element according to claim 1, further comprising a phase difference providing antireflection layer,
    wherein the phase difference providing antireflection layer is a laminate of dielectric films made of two or more kinds of dielectric material having different refractive indices, and the phase difference providing antireflection layer has an action of antireflection and an action of compensating for a phase difference of light incident obliquely on the liquid crystal cell.

15. The phase difference compensation element according to claim 14, wherein the dielectric film is at least one selected from the group consisting of $TiO_2$, $SiO_2$, $Ta_2O_5$, $Al_2O_3$, $CeO_2$, $ZrO_2$, $ZrO$, $Nb_2O_5$, and $HfO_2$.

16. The phase difference compensation element according to claim 1, comprising a matching layer provided between the transparent substrate and the optical anisotropic layer.

17. A liquid crystal display device comprising:
   a liquid crystal cell; and
   the phase difference compensation element according to claim 14.

18. The phase difference compensation element according to claim 1, further comprising a protection layer.

19. A liquid crystal display device comprising:
   a liquid crystal cell; and
   the phase difference compensation element according to claim 1.

20. A projection type image display device comprising:
   a light source that emits light;
   a projection optical system that projects modulated light; and
   the liquid crystal display device according to claim 19 disposed in an optical path between the light source and the projection optical system.

\* \* \* \* \*